Patented Nov. 3, 1931

1,829,762

UNITED STATES PATENT OFFICE

RICHARD SCHNEIDER AND FRANCOIS M. DUPONT, OF CHICAGO, ILLINOIS, ASSIGNORS, BY MESNE ASSIGNMENTS, TO INTERNATIONAL WHEAT MALT SYRUP COMPANY, OF DOVER, DELAWARE, A CORPORATION OF DELAWARE

PROCESS FOR THE MANUFACTURE OF WHEAT SIRUP

No Drawing.   Application filed December 1, 1927. Serial No. 237,120.

Our invention consists of an improved process of treating wheat to produce a sirup therefrom, containing sugar in the form of maltose, dextrines and soluble albumens or proteins, without using or adding other cereals or elements, and it consists also of the improved sirup itself.

While sirups have heretofore been made from different cereals and plant extracts, for example, corn, barley, beets, sugar-cane and sorghum, as far as we are aware, sirup has never been produced from wheat due to the fact that wheat does not respond to the treatments heretofore used in producing sirups from the other sugar sources referred to.

By our invention, we first malt the wheat in substantially the manner in which barley and other grains heretofore have been malted to develop in the grain the enzymes subsequently used in the further steps of treatment to which the grain has heretofore been subjected in producing sirup from it. The next step of our process is peculiar to the treatment of wheat, as distinguished from other grains, and is the result of much experimentation to determine just what treatment is required of the malted wheat to convert its insoluble albumens and starch into the desired constituents of the resulting sirup. We find it impossible to secure the contemplated result with the process of mashing heretofore employed with other grains, and by our process a special mashing treatment is employed involving definite temperatures and time intervals to the end that the insoluble albumens of the wheat may be converted into soluble albumens or proteins and that the starch of the wheat may be converted into sugar or maltose and dextrines in the desired proportions, by the action of the enzymes developed in the wheat by the malting operation.

The result of our improved process is a sirup produced entirely from wheat, which sirup as far as we are aware is a novel product and has characteristics radically different from similar sirups made from other grains. Our improved sirup is of use in many ways, for example, as a yeast food in the making of bread from wheat flour, as the sirup basis for non-alcoholic beverages, and as a yeast food in the manufacture of yeast, depending upon the relative proportions of sugar or maltose and dextrines contained in the sirup.

Our invention will be understood by reference to the following detail description which is illustrative of the preferred manner of carrying out our improved process.

The wheat is first malted in the usual manner to develop the enzymes diastase and peptase, in the amounts desired.

In the mashing operation which follows the malting operation, the wheat malt is ground to a sufficient degree of fineness to mix readily with the water employed and be permeated by it, the proportions being for example one barrel of water for each one hundred pounds of ground malt. The ground malt and water are mixed thoroughly with the water at a temperature of substantially 34° R., at which temperature the mixture is maintained for about fifteen minutes, after which it is permitted to rest for about one hour, the temperature being preferably maintained as stated during the entire interval. After this, the temperature is raised more or less slowly to from 46° R. to 58° R. and held at that temperature from about thirty mnutes to three quarters of an hour, and is then raised to from 58° R. to 62° R. more or less quickly, depending upon the degree of sugar or maltose content desired. In the event a high sugar content is desired with little dextrine in the sirup, after the initial rest period of one hour, the temperature is raised slowly to about 46° R., the mixture is held at this temperature for about thirty minutes, it is then raised slowly to about 54° R. and held at that temperature for about fifteen minutes, after which the temperature is raised to about 58° R. in about fifteen minutes and held at that temperature for about fifteen minutes longer. On the other hand, where a low sugar content is desired with a relatively high dextrine content, after the initial rest of one hour, the mixture is increased in temperature quickly to about 58° R. and held at that temperature for from thirty to forty-five minutes and the temperature of the mixture is then increased to about 62° R., at which temperature it is held until complete conversion of the starch of the wheat is effected, as shown by the well known iodine test. We find that increasing the temperature quickly and to a relatively high point causes the diastase to convert practically all of the starch of the wheat into dextrines, whereas a slower increase of temperature to a lower degree causes the diastase to convert most of the starch of the wheat into sugar or maltose and produces little of the dextrines. Obviously the quantity of sugar or maltose in the sirup can be controlled readily by the rapidity of increasing the temperature within the limits referred to, and by the degree to which the mixture is heated within the limits referred to during the mashing operation. Whatever the desired sugar content may be, the peptase acts during the mashing operation to convert the insoluble albumens of the wheat into soluble albumens or proteins.

When the starch of the wheat has been completely converted either into sugar or dextrines or both, the mash is run through a separator from which the wort or liquid is run into a collecting tank and the residue is lightly washed to leech from it the remaining sirup adhering to it. The liquid is then concentrated to a sirupy consistency in an evaporator.

The resulting finished sirup contains all of the soluble ingredients of the wheat, including the soluble mineral salts, the soluble maltose and dextrines resulting from the conversion of the starch, and the soluble proteins resulting from the conversion of the insoluble albumens.

When our improved sirup is employed in the making of wheat bread, it is desirable that it shall have a high sugar or maltose content to serve as a yeast food in connection with the fermentation that takes place during raising the bread. When used for this purpose, our improved sirup, which has a pale color as distinguished from the darker color of other grain sirups, lends itself most advantageously to the purpose, because of the characteristic of the sirup being entirely derived from the same kind of grain as that employed in the making of the bread, and the result is a bread of whiter appearance, finer grain and better taste, aroma and smoothness than where sirup produced from coarser grains is employed. These advantages apply generally to baked goods made from flour.

Another important use for our improved sirup is as the base of non-alcoholic beverages. In this case it is desirable to have a low sugar content, and a relatively high dextrine content is not objectionable but advantageous as a food element, and furthermore the dextrines and soluble albumens or proteins serve to produce a creamy and stable foam on the beverage when it is served, that is pleasing and attractive.

Our improved sirup is also of great use as a yeast food in connection with the manufacture of yeast, since the soluble protein content furnishes the food required by the yeast for its growth and the sugar or maltose and dextrine contents can be controlled so that the requisite proportion of these elements required by the proper growth of the yeast may be had.

While we have shown our invention in the particular embodiment above described, it will be understood that we do not limit ourselves to this exact treatment as we may employ equivalents known to the art at the time of the filing of this application without departing from the scope of the appended claims.

What we claim is:

1. The process of making wheat sirup consisting in grinding wheat malt, then mixing the ground wheat malt in substantially the proportion of one hundred pounds of ground malt to one barrel of water of a temperature of about 34° R., then agitating the mixture for about fifteen minutes, then permitting the mixture to rest for about one hour, then raising the temperature of the mixture slowly to about 46° R. and holding the mixture at that temperature for about thirty minutes, then raising the temperature of the mixture slowly to about 54° R. and holding the mixture at that temperature for about fifteen minutes, then raising the temperature of the mixture to about 58° R. in about fifteen minutes and holding the mixture at that temperature for about fifteen minutes, and then separating the liquid portion of the mixture from the solid portion thereof.

2. The process of making wheat sirup consisting in grinding wheat malt, then mixing the ground wheat malt with water of a temperature of about 34° R., then agitating the mixture for about fifteen minutes, then permitting the mixture to rest for about one hour, then raising the temperature of the mixture slowly to about 46° R. and holding the mixture at that temperature for about thirty minutes, then raising the temperature of the mixture slowly to about 54° R. and holding the mixture at that temperature for about fifteen minutes, then raising the temperature of the mixture to about 58° R. in about fifteen minutes and holding the mixture at that temperature for about fifteen minutes, and then separating the liquid portion of the mixture from the solid portion thereof.

3. The process of making wheat sirup consisting in grinding wheat malt, then mixing the ground wheat malt with water of a temperature of about 34° R., then agitating the mixture for about fifteen minutes, then permitting the mixture to rest for about one hour, then raising the temperature of the mixture by successive increments alternated with rest intervals to about 58° R., and then separating the liquid portion of the mixture from the solid portion thereof.

4. The process of making wheat sirup consisting in grinding wheat malt, then mixing the ground wheat malt with water of a temperature of about 34° R., then agitating the mixture for about fifteen minutes, then permitting the mixture to rest for about one hour, then raising the temperature of the mixture by successive increments alternated with rest intervals to between 55° R. and 65° R., and then separating the liquid portion of the mixture from the solid portion thereof.

5. The process of making wheat sirup consisting in grinding wheat malt, then mixing the ground wheat malt with warm water, then agitating the mixture, then permitting the mixture to rest, then raising the temperature of the mixture slowly to about 46° R. and holding the mixture at that temperature for about thirty minutes, then raising the temperature of the mixture slowly to about 54° R. and holding the mixture at that temperature for about fifteen minutes, then raising the temperature of the mixture to about 58° R. in about fifteen minutes and holding the mixture at that temperature for about fifteen minutes, and then separating the liquid portion of the mixture from the solid portion thereof.

6. The process of mashing wheat malt to produce wheat sirup consisting in mixing ground wheat malt with water of a temperature of about 34° R., then permitting the mixture to rest, then raising the temperature of the mixture slowly to about 46° R. and holding the mixture at that temperature for about thirty minutes, then raising the temperature of the mixture slowly to about 54° R. and holding the mixture at that temperature for about fifteen minutes, and then raising the temperature of the mixture to about 58° R. in about fifteen minutes and holding the mixture at that temperature for about fifteen minutes.

In witness whereof, we hereunto subscribe our names this 23rd day of November, A. D. 1927.

RICHARD SCHNEIDER.
FRANCOIS M. DUPONT.